(12) United States Patent
An et al.

(10) Patent No.: US 7,643,490 B2
(45) Date of Patent: Jan. 5, 2010

(54) LIVE CONTENT SWITCHING METHOD, SOURCE DEVICE, AND SINK DEVICE

(75) Inventors: Cheol-hong An, Suwon-si (KR); Alexandre Magzoumov, Suwon-si (KR); Ju-han Lee, Suwon-si (KR); Jun-hae Choi, Seongnam-si (KR); Ho-jeong You, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 669 days.

(21) Appl. No.: 11/191,060

(22) Filed: Jul. 28, 2005

(65) Prior Publication Data

US 2006/0034291 A1    Feb. 16, 2006

(30) Foreign Application Priority Data

Jul. 28, 2004    (KR)    ...................... 10-2004-0059113

(51) Int. Cl.
*H04L 12/28* (2006.01)
(52) U.S. Cl. ...................... 370/395.2; 709/231; 709/227
(58) Field of Classification Search .............. 370/395.3, 370/395.2; 725/38; 709/231, 227
See application file for complete search history.

(56) References Cited

U.S. PATENT DOCUMENTS

| | | | | |
|---|---|---|---|---|
| 6,226,677 B1 * | 5/2001 | Slemmer | ..................... | 709/227 |
| 6,457,054 B1 * | 9/2002 | Bakshi | ........................ | 709/227 |
| 7,139,813 B1 * | 11/2006 | Wallenius | ..................... | 709/219 |
| 2003/0206554 A1 | 11/2003 | Dillon | | |
| 2003/0208612 A1 | 11/2003 | Harris et al. | | |
| 2005/0111819 A1 * | 5/2005 | Cormack et al. | ............... | 386/46 |
| 2005/0237435 A1 * | 10/2005 | Potrebic et al. | ............. | 348/731 |

FOREIGN PATENT DOCUMENTS

| | | |
|---|---|---|
| JP | 2003-110561 A | 4/2003 |
| JP | 2003-188915 A | 7/2003 |
| JP | 2004-032669 A | 1/2004 |
| KR | 2001-35031 A | 5/2001 |
| KR | 2002-0070364 A | 9/2002 |
| KR | 20-0294609 Y1 | 10/2002 |
| KR | 2002-0075802 A | 10/2002 |
| KR | 2003-0068394 A | 8/2003 |

* cited by examiner

*Primary Examiner*—Dang T Ton
*Assistant Examiner*—Kevin Lee
(74) *Attorney, Agent, or Firm*—Sughrue Mion, PLLC (57) ABSTRACT

A live content switching method, a source device, and a sink device are provided. The method includes switching from first content to second content by using a dummy connection, the second content using the same resource of the source device as the first content. Accordingly, by using dummy connections set between a source device and a sink device, it is possible to switch the sink device from one live content to another live content without the need to cut off existing connections set between the source device and the sink device.

12 Claims, 7 Drawing Sheets

LIVE CONTENT SWITCHING METHOD, SOURCE DEVICE, AND SINK DEVICE

This application claims the benefit of Korean Patent Application No. 10-2004-0059113, filed on Jul. 28, 2004, in the Korean Intellectual Property Office, the disclosure of which is incorporated herein in its entirety by reference.

BACKGROUND OF THE INVENTION

1. Field of the Invention

The present invention relates to management of content via a network, and more particularly, to a live content switching method, a source device, and a sink device.

2. Description of the Related Art

Due to the advent and advance of the digital era, an increasing number of digital products, such as DVD players, cable set-top boxes, digital VCRs, digital TVs, and PCs, are being produced. In accordance with the trend of manufacturing digital products to be connectible to a single network, the Digital Home Working Group (DHWG) has established various home network standards for controlling the connection of various digital products to a network.

Today, a home network environment for multimedia is divided into three domains, i.e., a PC Internet world, a mobile world, and a consumer electronics (CE) broadcast world.

Figure 1:
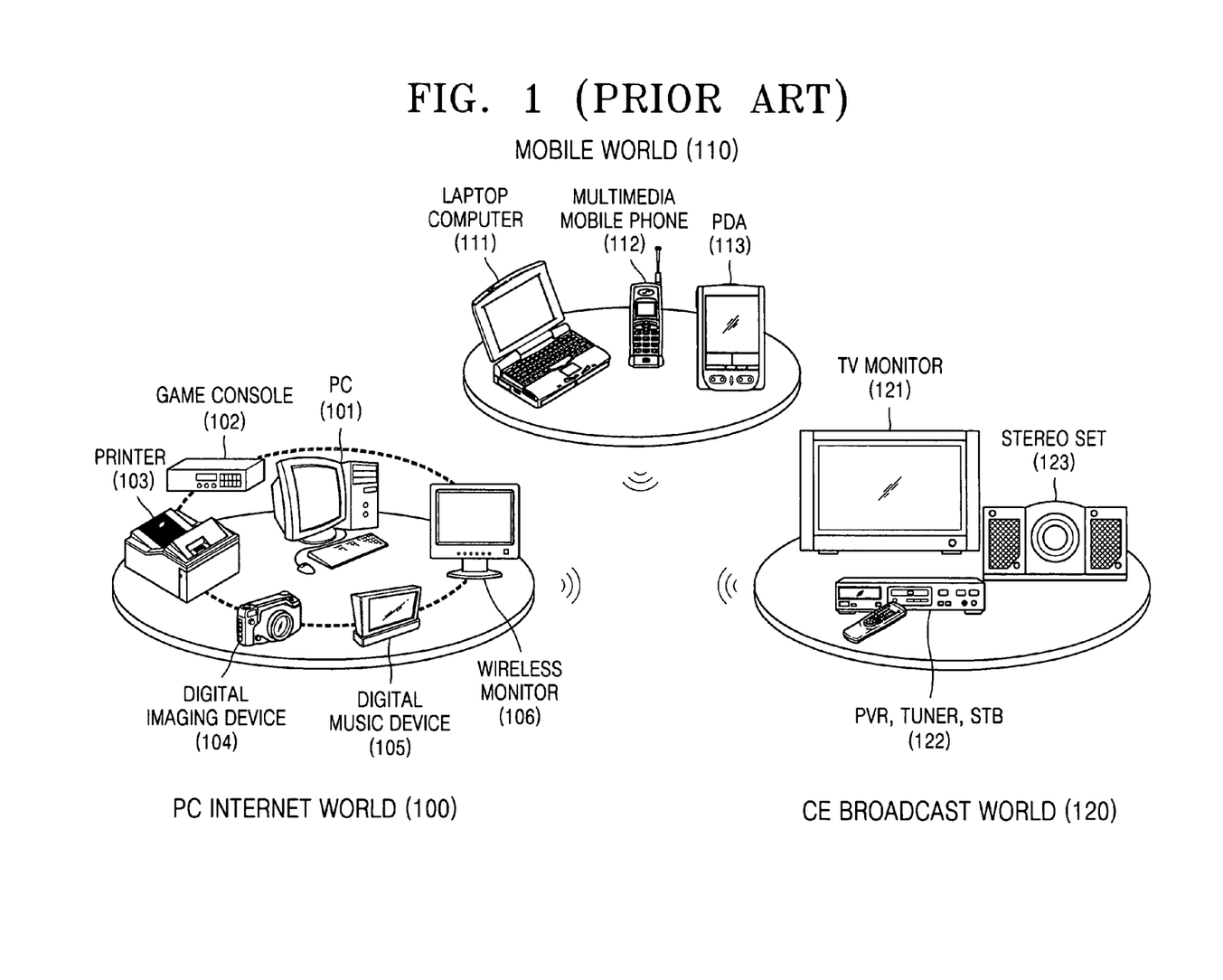
FIG. 1 is a diagram illustrating a conventional home network environment established based upon DHWG guidelines.

FIG. 1 is a diagram illustrating a conventional digital home network environment established based on DHWG guidelines.

A PC Internet world 100 consists of a PC 101 and PC peripherals, i.e., a game console 102, a printer 103, a digital imaging device 104, a digital music device 105, and a wireless monitor 106.

A mobile world 110 consists of mobile devices, i.e., a laptop computer 111, a multimedia mobile phone 112, and a personal digital assistant (PDA) 113. The mobile devices provide users with the freedom of movement into or out of a home network.

A CE broadcast world 120 consists of a TV monitor 121, a consumer electronics device 122, such as a personal video recorder (PVR), a tuner, or a set-top box (STB), and a stereo set 123.

Consumers want digital devices in the three digital worlds to work together in a home network. Therefore, it is necessary to carry out research on a home network that realizes the interoperability of digital devices belonging to different digital words.

A digital home network consists of a CE network, a mobile network, and a PC network and is based on IP networking and universal plug and play (UPnP) technologies. The CE network, the mobile network, and the PC network of the digital home network should cooperate with one another to achieve transparent, simple, and seamless interoperability thereamong.

Media management and control based on UPnP audio/video (A/V) technology enables digital devices and applications to identify, manage, and distribute media content over a home network and to transmit the media content to mobile devices over the home network.

UPnP is an architecture for peer-to-peer network connection of intelligent applications, wireless devices, and PCs and is versatile and easy to use in a small-size network, for example, home or small business, and is designed to provide a connection based on the standard. The UPnP architecture defines general interaction between an UPnP control point and UPnP devices. The UPnP architecture allows UPnP devices to support content and transmission protocols in any form. The UPnP devices include a TV, a VCR, a compact disc (CD)/DVD player, an STB, a stereo system, a Motion Picture Experts Group (MPEG) audio layer 3 (MP3) player, a still camera, a camcorder, a PC, and so on. An AV architecture allows devices to support content of different formats (e.g., MPEG2, MPEG4, Joint Photographic Experts Group (JPEG), MP3, bitmap (BMP), and Window media architecture (WMA)) and transmission protocols of various types (e.g. Institute of Electrical and Electronics Engineers (IEEE)-1394, Hyper Text Transfer Protocol (HTTP) GET, Live Transport Protocol (RTP), HTTP PUT/POST, and Transmission Control Protocol (TCP)/IP).

The majority of UPnP AV scenarios include transmitting content (e.g., movies, music, and pictures) from one device to another device. An AV control point interacts with at least two UPnP devices that act as a source and a sink.

A media server has content a user wants to render. The media server may include or access a plurality of content. The media server accesses the plurality of content and transmits them to another device via a network, using a predetermined transmission protocol. Examples of the media server include, a VCR, a CD/DVD player, a camera, a camcorder, a PC, an STB, a satellite receiver, an audio tape player, and so on.

A media server control point controls and manages the media server according to a user's preference so as to make the media server perform an operation (e.g., data reproduction) desired by the user. Also, the media server control point provides a user interface so that the user can interact with devices to control the devices. Examples of the media server control point include, a TV having a general remote control, and a wireless PDA device. In addition, when required by the user, the media server control point may control the flow of content by invoking various AV transmission actions such as 'stop', 'pause', 'fast forward', 'rewind', and 'skip'.

Figure 2:
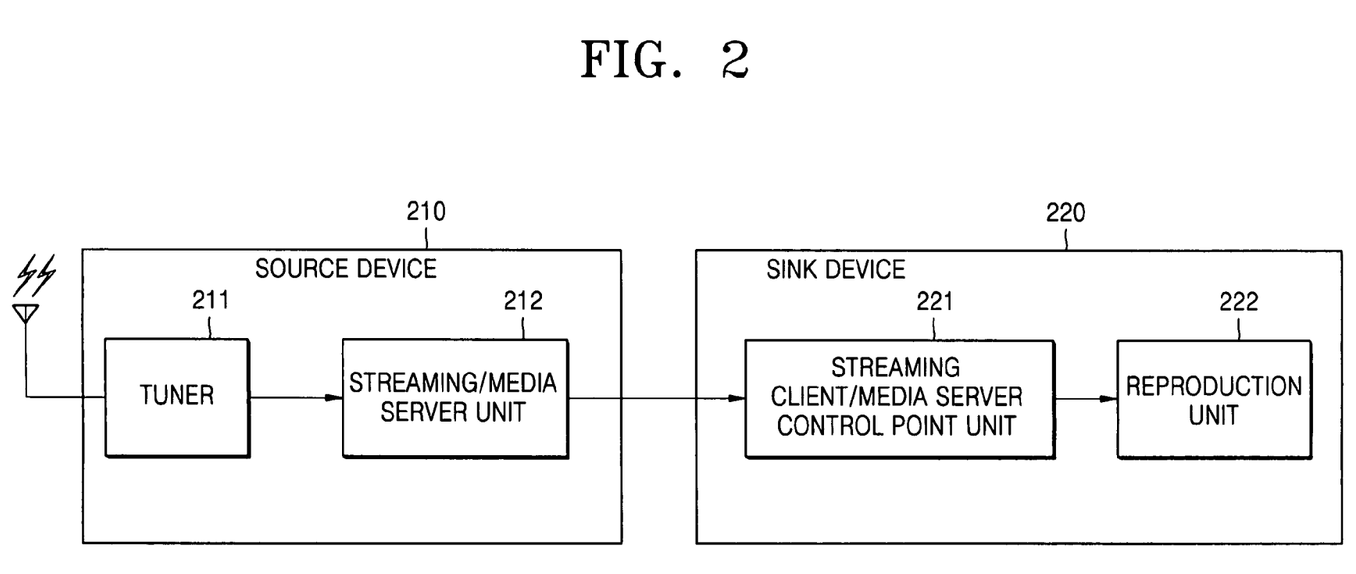
FIG. 2 is a block diagram of a conventional live content switching system.

FIG. 2 is a block diagram of a conventional system for switching live contents over a network. Referring to FIG. 2, the conventional system includes a source device 210 and a sink device 220.

The source device 210 provides content to the sink device 220 via a streaming server in a streaming server+media server unit 212 and provides information on the content to the sink device 220 via a media server in the streaming server+media server unit 212.

A tuner 211 switches from one channel to another channel, via which the source device 210 receives content from a network, and provides the content received from the network to the streaming server+media server unit 212.

The sink device 220 includes a streaming client+media server control point unit 221, which includes a streaming client and a media server control point. The media server control point fetches information on content from the source device 210 and performs its operations in response to commands input by a user. For example, when the media server control point receives a 'play' command from the user, it reads content of interest from the source device 210 by using an HTTP protocol. The streaming client receives content from the source device 210 and provides the received content to a reproduction unit 222.

Figure 3:
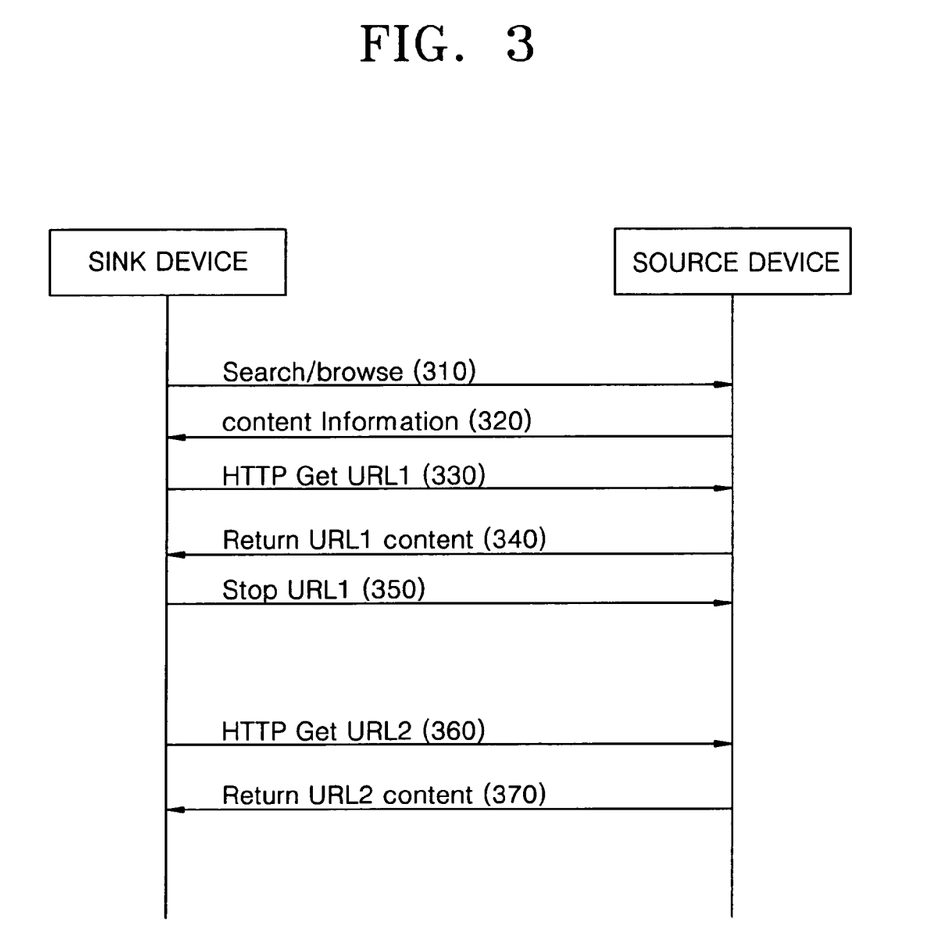
FIG. 3 is a flowchart of a conventional live content switching method.

FIG. 3 is a flowchart illustrating a conventional live content switching method. Referring to FIG. 3, in operation 310, a sink device transmits a 'browse' or 'search' command to a source device in order to obtain information on content from the source device. In operation 320, the source device transmits the information on the content to the sink device. In operation 330, the sink device transmits an HTTP GET command with URL1 specified therein (hereinafter, referred to as an HTTP GET URL1 command) to the source device in order to receive content corresponding to URL1 from the source device. In operation 340, the source device transmits the content corresponding to URL1 to the sink device.

In order to receive content corresponding to URL2 from the source device, the sink device transmits a 'stop' command to the source device in operation 350 and transmits an HTTP GET URL2 command to the source device in operation 360. In operation 370, the source device sequentially executes the 'stop' command and the HTTP GET URL2 command, which have been transmitted from the source device, such that the content corresponding to URL2 is transmitted to the sink device. Here, the 'stop' command may not be an actual command transmitted from the sink device to the source device. In other words, even though the source device does not receive the 'stop' command from the sink device, it may automatically stop transmitting the content corresponding to URL1 when it senses that a TCP connection to a network layer is released.

As described above, in the conventional system, it always takes much time to switch from one live content to another live content. For example, in the conventional system, in order to switch from the first live content to the second live content while receiving the first live content, it is necessary to release an existing connection established for the receipt of the first live content, withdraw all hardware/software resources allotted to the existing connection, set a new connection for the receipt of the second live content, and allot resources to the new connection, rather than simply switching from a channel corresponding to the first live content to a channel corresponding to the second live content while maintaining the hardware/software resources allotted to the existing connection. Therefore, the time required for switching from the first live content to the second live content increases undesirably.

SUMMARY OF THE INVENTION

The present invention provides a live content switching method, a source device, and a sink device, which can quickly switch from one live content to another live content.

According to an aspect of the present invention, there is provided a method of switching content over a network. The method includes switching from first content to second content by using a dummy connection, the second content using the same resource of the source device as the first content.

The switching from the first content to the second content may include: determining whether the second content uses the same resource of the source device as the first content; transmitting a request for the second content to the source device if the second content uses the same resource of the source device as the first content; and receiving the second content from the source device in response to the request for the second content through the dummy connection and an existing connection.

The switching from the first content to the second content may also include issuing a request for cutting off the dummy connection to the source device.

According to another aspect of the present invention, there is provided a method of switching content over a network. The method includes switching from first content to second content by using a dummy connection if a command to switch from the first content to the second content is received from a sink device that consumes content, the second content using the same resource as the first content.

The switching from the first content to the second content may include: receiving a command to provide the second content from the sink device through the dummy connection; and transmitting the second content to the sink device in response to the command to provide the second content through the dummy connection and an existing connection.

The switching from the first content to the second content may also include receiving a command to release the dummy connection from the sink device and releasing the dummy connection in response to the command to release the dummy connection.

According to another aspect of the present invention, there is provided a sink device which switches from one content to another content over a network. The sink device includes a controller, which switches from first content to second content by using a dummy connection, the second content using the same resource of the source device as the first content.

The controller may determine whether the second content uses the same resource as the first content, may transmit a request for the second content to the source device if the second content uses the same resource as the first content, and may control the second content to be received from the source device in response to the request for the second content through the dummy connection and an existing connection.

The controller may issue a request for releasing the dummy connection to the source device.

According to another aspect of the present invention, there is provided a source device which switches from one content to another content over a network. The source device includes a controller, which switches from first content to second content by using a dummy connection if a command to switch from the first content to the second content is received from the sink device, the second content using the same resource as the first content.

The controller may receive a command to provide the second content from the sink device and may transmit the second content to the sink device in response to the command to provide the second content through the dummy connection and an existing connection.

The controller may receive a command to release the dummy connection from the sink device and may release the dummy connection in response to the command to release the dummy connection.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 4:
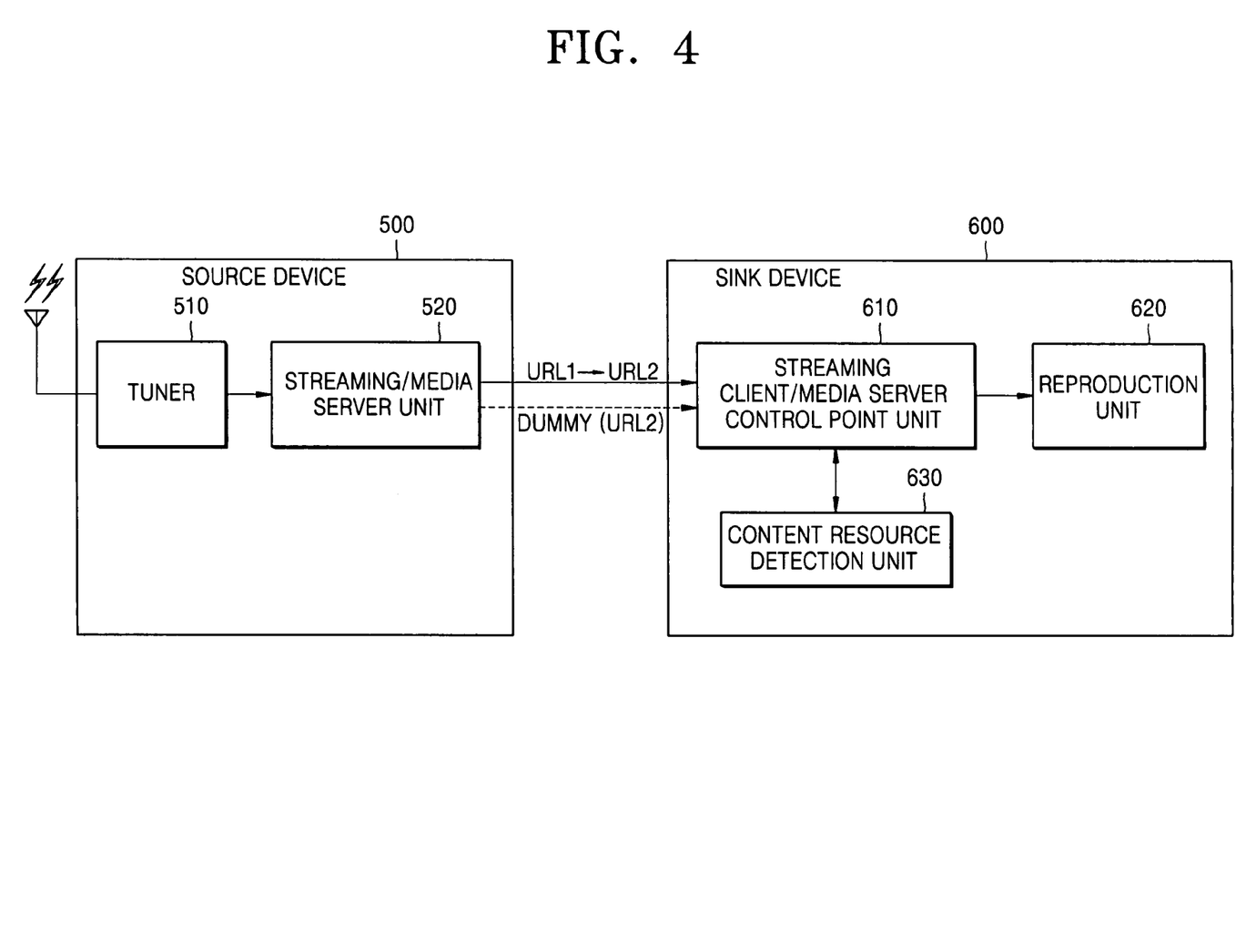
FIG. 4 is a block diagram of a live content switching system according to an exemplary embodiment of the present invention.

FIG. 4 is a block diagram of a live content switching system according to an exemplary embodiment of the present invention. Referring to FIG. 4, the live content switching system includes a source device 500 and a sink device 600. The source device 500 receives a request for live content from the sink device 600 and transmits the live content to the sink device 600. The sink device 600 obtains information on the live content from the source device 500, receives the live content from the source device 500, and consumes the received live content.

Figure 5:
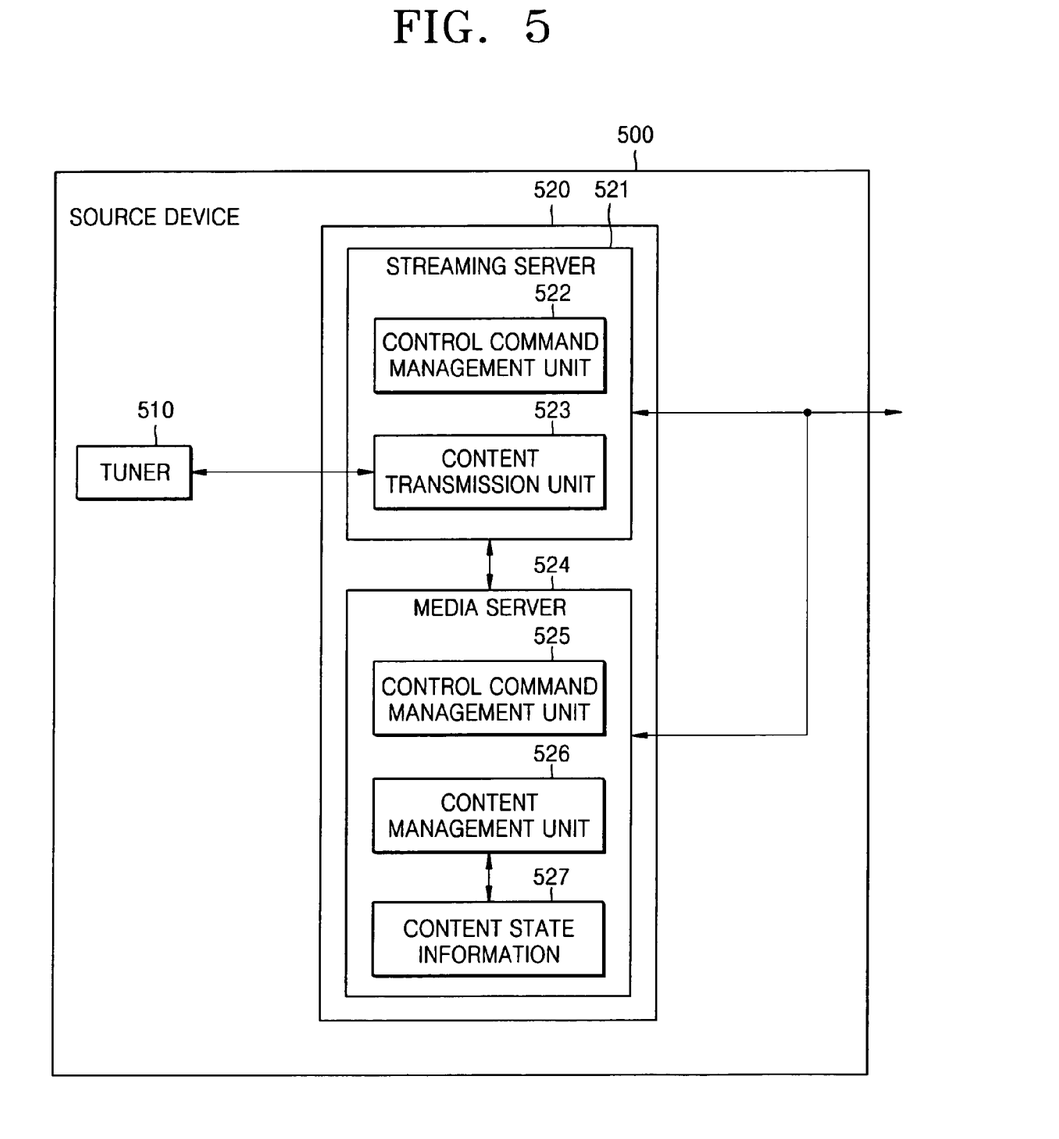
FIG. 5 is a detailed block diagram of a source device of FIG. 4.

The source device 500 includes a tuner 510 and a streaming server+media server unit 520, which includes a streaming server (521 of FIG. 5) and a media server (524 of FIG. 5).

The tuner 510 receives live content broadcasted via a network and provides the received live content to the streaming server+media server unit 520.

The streaming server provides the sink device 600 with live content, and a media server provides the sink device with information on the live content.

The sink device 600 includes a streaming client+media server control point unit 610, a reproduction unit 620, and a content resource detection unit 630. The streaming client+media server control point unit 610 includes a streaming client (611 of FIG. 6) and a media server control point (614 of FIG. 6). The sink device 600 consumes A/V content received from the source device 500. For example, if a user issues a 'play' command to the sink device 600, the sink device 600 reads predetermined data designated by the 'play' command by using HTTP protocol.

The media server control point obtains information on live content from the source device 500 and performs its operations according to a command issued by a user, and the streaming client transmits a control command to the source device 500 and receives the live content from the source device 500.

The reproduction unit 620 receives live content from the streaming client and reproduces the received live content.

The content resource detection unit 630 determines whether a resource of content currently being input to the sink device 600 from the source device 500 is the same as a resource of content, to which the sink device 600 is desired to be switched, and provides the determination results to the streaming client+media server control point unit 610.

In the present embodiment, even in a case where while receiving live content from the source device 500 through an existing connection established between the source device 500 and the sink device 600, the sink device 600 is desired to switch the live content currently being received to another live content, the existing connection is not released. More specifically, the sink device 600 issues a request for live content of a different channel from the content currently being received to the source device 500 with the use of a dummy connection, and the source device 500 transmits the live content of the different channel to the sink device 600 with the use of the existing connection and the dummy connection. Therefore, it is possible to reduce the time required for switching from one live content to another live content using the same resource by transmitting the contents from the source device 500 to the sink device 600 via the existing connection and the dummy connection without releasing the existing connection.

FIG. 5 is a detailed block diagram of the source device 500 of FIG. 4. More specifically, FIG. 5 illustrates in further detail the structure of the streaming server+media server unit 520 of the source device 500. Referring to FIG. 5, the streaming/server unit 520 includes the streaming server 521 and the media server 524.

The media server 524 includes a control command manager 525, a content management unit 526, and content state information 527.

The control command manager 525 generates a control command and transmits the control command to the sink device 600. In addition, the control command manager 525 receives a control command from the sink device 600, interprets the received control command, and performs its operations based on the interpretation result. More specifically, the control command manager 525 receives, for example, a 'browse' or 'search' command, from the sink device 600, interprets the 'browse' or 'search' command, and controls the content management unit 526 based on the interpretation result to transmit state information of content of interest to the sink device 600.

The content management unit 526 manages state information of various contents, i.e., the content state information 527. In other words, when the content management unit 526 receives a request for information on content from the media server control point of the sink device 600, it searches for the requested content information and transmits the requested content information to the sink device 600. The control command manager 525 and the content management unit 526 operate under the control of a controller (not shown).

The streaming server 521 includes a control command manager 522 and a content transmitter 523.

The control command manager 522 receives from the sink device 600 a control command for content requested by the sink device 600, interprets the received control command, and controls the content transmission unit 523 based on the interpretation result. Here, the control command for the content requested by the sink device 600 includes 'play', 'pause', 'resume', 'FF', and 'RW'.

The content transmitter 523 receives live content requested by the sink device 600 from the tuner 510 and then transmits the received live content to the sink device 600. Alternatively, the content transmitter 523 reads the requested live content from the storage unit 530 and then transmits the live content read out from the storage unit 530 to the sink device 600.

In a case where the source device 500 receives a request for live content from the sink device 600, the content transmitter 523 newly sets a dummy connection while maintaining an existing connection established between the source device 500 and the sink device 600, and then transmits the live content, requested by the sink device 600, to the sink device 600 through the newly set dummy connection. For example, if the request for the live content transmitted from the sink device 600 only requires a current channel to be switched from a first channel of the tuner 510 to a second channel of the tuner 510, the tuner 510 switches the current channel from the first channel to the second channel of the tuner 510, and the content transmitter 523 transmits the live content to the sink device 600 by using both the existing connection and the dummy connection, through which the sink device 600 has transmitted the request for the live content to the source device 500.

The control command manager 522 and the content transmitter 523 operate under the control of a controller (not shown).

Figure 6:
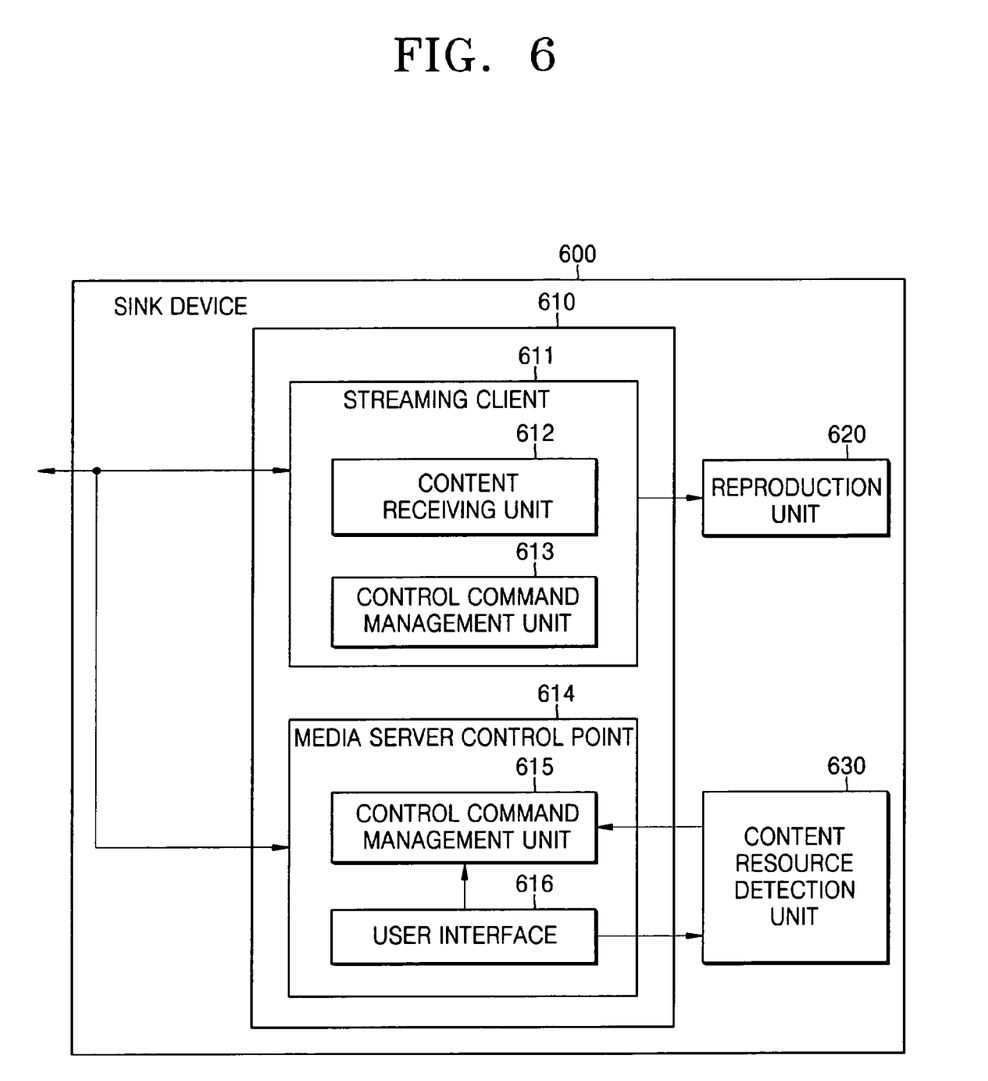
FIG. 6 is a detailed block diagram of a sink device of FIG. 4.

FIG. 6 is a detailed block diagram of the sink device 600 of FIG. 4. More specifically, FIG. 6 illustrates in greater detail the structure of the streaming client+media server control point unit 610 of the sink device 600. Referring to FIG. 6, the streaming client/media server control point 610 includes the streaming client 611 and the media server control point 614.

The media server control point 614 includes a control command manager 615 and a user interface 616.

The user interface 616 receives a control operation command for A/V content of interest, e.g., a 'play' command, from a user and transmits the received control operation command to the control command manager 615.

The content resource detection unit 630 determines whether content, to which a user desires the sink device 600 to be switched, uses the same resource of the source device 500 as content currently being received by the sink device 600 and determines whether to issue a control command to the source device 500 via a dummy connection or a regular connection based on the determination results.

The control command manager 615 issues a request for information on the A/V content of interest to the source device 500 by transmitting a 'browse' or 'search' command to the source device 500. When receiving the requested A/V content information from the source device 500, the control command manager 615 interprets the received A/V content information and transmits the interpretation result or information on the control operation command received from the user via the user interface 616 to the streaming client 611. When receiving from the source device 500 an event message indicating that state information of the A/V content of interest has been modified, the control command manager 615 issues to the source device 500 a request for information on modifications made to the state information of the A/V content of interest and receives the requested information from the source device 500. The control command manager 615 and the user interface 616 operate under the control of a controller (not shown).

The streaming client 611 includes a control command manager 613 and an A/V content receiver 612.

The control command manager 613 generates a control command for the A/V content of interest by referring to information received from the media server control point 614, i.e., the information on the control operation command received from the user or the result of interpreting the information on the A/V content of interest, and then transmits the control command to the source device 500. If the information received from the media server control point 614 specifies that the control command received from the user requires switching the sink device 600 from first live content to second live content, using the same resource of the source device 500 as the first live content, the control command manager 613 transmits a request for the second live content to the source device 500 through a dummy connection without releasing an existing connection set for the transmission of the first live content between the source device 500 and the sink device 600. Once the sink device 600 starts receiving the second content from the source device 500 not only through the existing connection but also through the dummy connection, the control command manager 613 may transmit a command to release the dummy connection to the source device 500.

The content receiver 612 receives the A/V content of interest from the source device 500 and then transmits the received A/V content of interest to the reproduction unit 620. The control command manager 613, the content receiver 612, and the content source detection unit 630 operate under the control of a controller (not shown).

Figure 7:
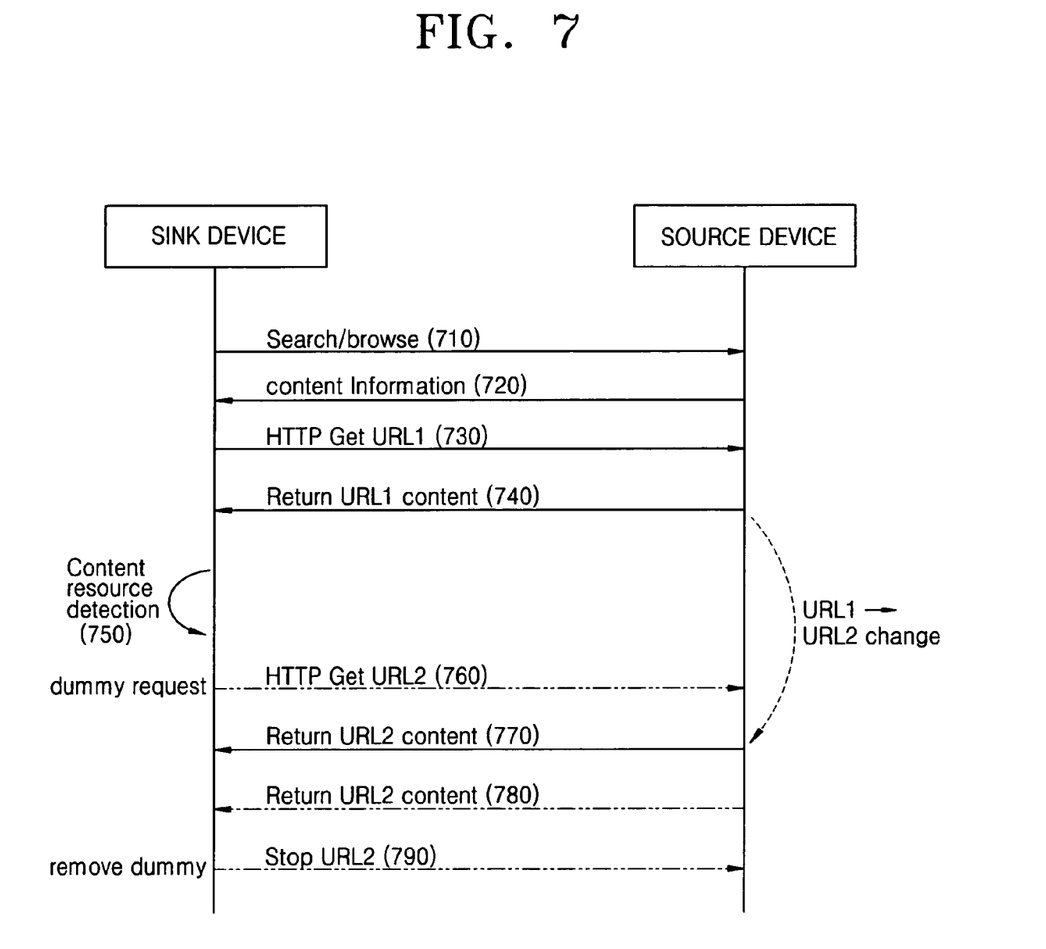
FIG. 7 is a flowchart of a live content switching method according to an exemplary embodiment of the present invention.

FIG. 7 is a flowchart of a live content switching method according to an exemplary embodiment of the present invention. Referring to FIG. 7, live content is transmitted between a source device and a sink device by using an HTTP transmission protocol.

In operation 710, the sink device transmits a 'browse' or 'search' command to the source device in order to obtain information on content from the source device.

In operation 720, the source device transmits the information on the content to the sink device in response to the 'browse' or 'search' command.

In operation 730, the sink device transmits an HTTP GET command having URL1 specified therein to the source device with reference to the information on the content received from the source device in order to obtain content corresponding to URL1 from the source device.

In operation 740, the source device transmits the content corresponding to URL1 to the sink device. For example, the content corresponding to URL1 may be content of a single channel, which is transmitted from a tuner of the source device to the sink device.

If the sink device selects content corresponding to URL2 while receiving the content corresponding to URL1, a content resource detection unit of the sink device determines whether the content corresponding to URL2 uses the same resource of the source device as the content corresponding to URL1 in operation 750. If the content corresponding to URL2 uses the same resource of the source device as the content corresponding to URL1, the sink device transmits a command to transmit the content corresponding to URL2 to the source device by using a dummy connection.

If the content corresponding to URL2 uses the same tuner of the source device as the content corresponding to URL1, the sink device transmits an HTTP GET command having URL2 specified therein to the source device by using the dummy connection in operation 760.

Then, the source device switches the sink device from a tuner channel corresponding to URL1 to a tuner channel corresponding to URL2 in response to the HTTP GET command from the sink device in operation 760. Accordingly, in operation 770, the content corresponding to URL2 is transmitted from the source device to the sink device through an existing connection established for the transmission of the content corresponding to URL1 from the source device to the sink device. In operation 780, the content corresponding to URL2 is transmitted from the source device to the sink device via the dummy connection.

In operation 790, the sink device transmits a command to release the dummy connection to the source device. Due to the existence of the existing connection, the interaction between the source device and the sink device is not affected by releasing the dummy connection. Here, more than one dummy connection may be provided between the source device and the sink device. As a result of releasing the dummy connection, the sink device can be successfully switched from the content corresponding to URL1 to the content corresponding to URL2 while maintaining the existing connection.

The present invention has been described above as being applicable to contents using the same resource of a source device, particularly, contents using the same tuner of the source device. In general, the present invention is applicable to any contents using the same hardware of the source device regardless of whether the hardware is a tuner of the source device.

The live content switching method according to the present invention, which is performed between the source and sink devices according to the present invention, may be configured as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for configuring the processing methods can be easily construed by programmers skilled in the art to which the present invention pertains.

As described above, according to the present invention, by using dummy connections set between a source device and a sink device, it is possible to switch the sink device from one live content to another live content without the need to release existing connections set between the source device and the sink device.

While the present invention has been particularly shown and described with reference to exemplary embodiments thereof, it will be understood by those of ordinary skill in the art that various switches in form and details may be made therein without departing from the spirit and scope of the present invention as defined by the following claims.

What is claimed is:

1. A method of switching content over a network, the method comprising:
   receiving at a sink device that consumes streaming content first content provided by a resource of a source device over a first Transmission Control Protocol/Internet Protocol (TCP/IP) connection between the source device and the sink device;
   determining whether second content provided by the source device is provided by the resource of the source device;
   requesting the second content provided by the resource of the source device over a dummy TCP/IP connection between the source device and the sink device if it is determined that the first content and the second content are provided by the resource of the source device; and
   receiving at the sink device the second content provided by the resource of the source device over the dummy TCP/IP connection while receiving the second content provided by the resource of the source device over the first TCP/IP connection.

2. A method of switching content over a network, the method comprising:
   switching from first content which is received through a first connection to second content by using a dummy connection, the second content being provided by a same resource of a source device as the first content, wherein the switching from the first content to the second content comprises:
      determining whether the second content is provided by the same resource of the source device as the first content when the second content is selected at a sink device;
      transmitting a request for switching from the first content, which is transmitted through the first connection, to the second content, to the source device, using the dummy connection if it is determined that the second content is provided by the same resource of the source device as the first content; and
      receiving the second content from the source device through the dummy connection and the first connection in response to the request for the second content.

3. The method of claim 2, wherein the switching from the first content to the second content further comprises:
   issuing a request for cutting off the dummy connection to the source device.

4. A method of switching content over a network, the method comprising:
   by a source device that provides streaming content, switching from first content to second content by using a dummy connection if a command to switch from the first content to the second content is received from a sink device that consumes the streaming content, the second content being provided by a same resource as the first content, wherein the switching from the first content to the second content comprises:
      receiving the command for switching from the first content, which is transmitted through the first connection, to the second content, from the sink device, using the dummy connection; and
      transmitting the second content to the sink device through the dummy connection and an exiting connection in response to the command to provide the second content.

5. The method of claim 4, wherein the switching from the first content to the second content further comprises:
   receiving a command to release the dummy connection from the sink device and releasing the dummy connection in response to the command to release the dummy connection.

6. A sink device which switches from one content to another content over a network, the sink device comprising:
   a controller, which switches from first content to second content by using a dummy connection, the second content using a same resource of a source device as the first content,
   wherein the controller determines whether the second content uses the same resource as the first content, transmits a request for switching from the first content, which is transmitted through a first connection, to the second content, to the source device, using the dummy connection if it is determined that the second content is provided by the same resource as the first content, and controls the second content to be received from the source device through the dummy connection and the first connection in response to the request for the second content.

7. The sink device of claim 6, wherein the controller issues a request for releasing the dummy connection to the source device.

8. A source device which switches from one content to another content over a network, the source device comprising:
   a controller, which switches from first content to second content by using a dummy connection if a command to switch from the first content to the second content is received from a sink device, the second content using a same resource as the first content,
   wherein the controller receives the command for switching from the first content, which is transmitted through a first connection, to the second content, from the sink device, using the dummy connection and transmits the second content to the sink device through the dummy connection and the first connection in response to the command to provide the second content.

9. The source device of claim 8, wherein the controller receives a command to release the dummy connection from the sink device and releases the dummy connection in response to the command to release the dummy connection.

10. The method according to claim 1, wherein the first content and the second content are streaming media content.

11. The method according to claim 1, wherein receiving at the sink device the second content over the dummy TCP/IP connection while receiving the second content over the first TCP/IP connection comprises maintaining the first TCP/IP connection.

12. The method according to claim 1, wherein the resource of the source device is a tuner of the source device.

* * * * *